United States Patent
Yuan

(10) Patent No.: US 9,218,674 B2
(45) Date of Patent: Dec. 22, 2015

(54) BAYESIAN APPROACH FOR GAS CONCENTRATION RECONSTRUCTION BASED ON TUNABLE DIODE LASER ABSORPTION SPECTROSCOPY

(75) Inventor: Chao Yuan, Plainsboro, NJ (US)

(73) Assignee: Siemens Aktiengessellschaft, Munich (DE)

(*) Notice: Subject to any disclaimer, the term of this patent is extended or adjusted under 35 U.S.C. 154(b) by 57 days.

(21) Appl. No.: 14/345,418

(22) PCT Filed: Aug. 22, 2012

(86) PCT No.: PCT/US2012/051827
§ 371 (c)(1),
(2), (4) Date: Mar. 19, 2014

(87) PCT Pub. No.: WO2013/043298
PCT Pub. Date: Mar. 28, 2013

(65) Prior Publication Data
US 2014/0347365 A1    Nov. 27, 2014

Related U.S. Application Data

(60) Provisional application No. 61/536,704, filed on Sep. 20, 2011.

(51) Int. Cl.
*G06T 11/00* (2006.01)
*G06T 11/20* (2006.01)

(52) U.S. Cl.
CPC ............ *G06T 11/006* (2013.01); *G06T 11/206* (2013.01); *G06T 2211/424* (2013.01); *G06T 2211/436* (2013.01)

(58) Field of Classification Search
None
See application file for complete search history.

(56) References Cited

U.S. PATENT DOCUMENTS

| | | | | |
|---|---|---|---|---|
| 2003/0194048 | A1* | 10/2003 | De Man | G06T 11/006 378/4 |
| 2009/0135993 | A1* | 5/2009 | Harer | A61B 6/032 378/4 |
| 2010/0119034 | A1* | 5/2010 | Hein | G06T 11/005 378/19 |

OTHER PUBLICATIONS

Salem "Tomographic measurement of breakthrough in a packed bed adsorber" Chemical Engineering Science 60 (2005) pp. 51-522.*
"A Bayesian Approach for Gas Concentration Reconstruction Based on Tunable Diode Laser Absorption Spectroscopy"; Yuan, Chao; IEEE International Conference on Acoustics, Speech, and Signal Processing ICASSP 2012; XP55043607; ISBN: 978-1-46-730044-5; 2012; US; Mar. 25, 2012.

(Continued)

*Primary Examiner* — Maurice L McDowell, Jr.

(57) ABSTRACT

Systems and methods construct a 2 dimensional (2D) gas concentration map (image) from data from one or more laser based absorption projection paths. Embodiments use a Bayesian approach to construct a 2D gas concentration map of a combustion region cross section plane by modeling the 2D map as a Gaussian Process (GP). The GP models the global correlation among all pixels in the 2D map. Data from one or more projection paths is propagated to all pixels in the map instead of just local pixels. The correlation among map pixels is used to propagate projection path data from map pixels traversed by a projection path to other map pixels.

18 Claims, 9 Drawing Sheets

(56) References Cited

OTHER PUBLICATIONS

"Infrared Species Limited Data Tomography Through Tikhonov Reconstruction"; Daun, et al.; Journal of Quantitative Spectroscopy and Radiative Transfer, Elsevier Science, Oxford, GB, vol. 111, No. 1; XP026709772; ISSN: 0022-4073; 2010; GB; Jan. 1, 2010.
Intl. Search Report.

* cited by examiner

BAYESIAN APPROACH FOR GAS CONCENTRATION RECONSTRUCTION BASED ON TUNABLE DIODE LASER ABSORPTION SPECTROSCOPY

CROSS REFERENCE TO RELATED APPLICATIONS

This application claims the benefit of U.S. Provisional Application No. 61/536,704, filed on Sep. 20, 2011, the disclosure which is incorporated herein by reference in its entirety.

BACKGROUND OF THE INVENTION

The invention relates generally to 2-dimensional (2D) gas concentration map construction. More specifically, the invention relates to a Gaussian Process (GP) that propagates data from individual projection path average measurement values to all pixels in a 2D map and models the global correlation among all pixels.

Tunable Diode Laser Absorption Spectroscopy (TDLAS) is a technique for measuring gas (e.g., $O_2$, CO) concentrations and temperatures simultaneously for combustion systems such as a boiler. A TDLAS system measures an average value of a parameter over a predetermined projection path through a combustion region. One active research area in TDLAS is to reconstruct a 2D gas concentration map based on multiple projection path averages. A gas concentration map is useful in many applications such as combustion monitoring, diagnosis and optimization.

To construct a gas concentration map is a problem of 2D reconstruction from 1-dimensional (1D) projections, which is similar to the concept of Computed Tomography (CT) used in medical imaging. However, most widely used CT algorithms, such as filtered back projection, require many projections (multiple views and dense projections per view) to achieve a high resolution. In contrast, only a very small number of projection paths are typically set up on a boiler. For example, it is not uncommon that only five to ten projection paths are used. Additionally, a projection path may not be through an optimal location or at an optimal direction (view) because of physical restrictions or mounting difficulties. These challenges result in a large percentage of pixels in the map that are unobserved (not traversed) by a single projection path.

Since CT image reconstruction uses the Algebraic Reconstruction Technique (ART), ART would appear to be a natural fit because it can handle the issue of a small number of projections. However, for this extremely under-constrained problem (the number of unknown variables, gas concentrations in a 2D map, is far more than the number of available equations), ART may not be realizable.

Smoothness constraints among neighboring pixels are introduced as prior information to help address this under-constrained problem. Smoothness can be incorporated using smooth basis functions or bicubic spline interpolation as a post-processing step. However, smoothness constraints are local and cannot capture long range correlation among pixels. This requirement is difficult to meet due to the above challenges.

What is desired is a method and system that constructs a gas concentration map from 1D projection path averages.

SUMMARY OF THE INVENTION

The inventor has discovered that it would be desirable to have a system and method that construct a 2-dimensional (2D) gas concentration map (image) from data from one or more laser-based absorption projection paths. Embodiments use a Bayesian approach to construct a 2D gas concentration map of a combustion region cross-section plane by modeling the 2D map as a Gaussian Process (GP). The GP models the global correlation among all pixels in the 2D map. Data from one or more projection paths is propagated to all pixels in the map instead of just local pixels. The correlation among map pixels is used to propagate projection path data from map pixels traversed by a projection path to other map pixels.

One aspect of the invention provides a method that constructs a two dimensional map (image) from one dimensional projection path data. Methods according to this aspect of the invention include defining a map having M×N pixels that represents a cross-section plane, identifying boundary coordinate locations on the map that define one or more projection paths where $i=1, 2, \ldots, I$ represents the number of projection paths, identifying the map pixels that are traversed by the I projection paths, calculating a pixel projection path length for each map pixel that is traversed by each projection path i, propagating the pixel projection lengths to other map pixels, and correlating the pixel projection lengths.

Another aspect of the invention provides a method that constructs a two dimensional map (image) from one dimensional projection path data. Methods according to this aspect of the invention include defining a map matrix v having M×N pixels that represents a cross-section plane, identifying boundary coordinate locations on the map matrix v that define one or more projection paths where $i=1, 2, \ldots, I$ represents the number of projection paths, identifying the map matrix v pixels that are traversed by the I projection paths, calculating a pixel projection path length for each map matrix v pixel that is traversed by each projection path i, for each projection path i, representing the map matrix v as a J-dimensional vector, where J=M×N, for each J-dimensional vector, entering a value of zero for pixels that are not traversed by its projection path and entering pixel projection path lengths for pixels traversed by its projection path, defining a projection matrix A, where A=I×J from all of the J-dimensional vectors, normalizing each J-dimensional vector $A_{i,+}$ ($i=1, 2, \ldots, I$), receiving projection path data for the one or more projection paths as an I-dimensional vector b, defining a relationship b=Av, selecting a signal variance parameter f, selecting a spread parameter r, calculating a cross-covariance matrix $$C_{j1,j2} = f \exp\left( \frac{-(x_{j1} - x_{j2})^2 + (y_{j1} - y_{j2})^2}{r^2} \right)$$

between pixels for map matrix v, selecting a noise variance $\sigma^2$, calculating an average of projection path data for each projection path, from a predetermined number of projection path data, and if more than one projection paths are employed, calculating an average based on an average of all individual projection path data averages, calculating the estimate of map matrix v as $\tilde{v} = CA^T(ACA^T + \sigma^2 I)^{-1}(b - Am) + m$, and representing $\tilde{v}$ as map matrix v.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 4A-4D use a SART algorithm to construct each map and are compared with a ground truth map, FIG. 4E. FIGS. 4F-4I use embodiments to construct each map and are compared with the ground truth map, FIG. 4J.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions that employ a Bayesian approach to construct a 2D gas concentration map (image) of a combustion region cross-section plane by modeling the 2D map as a Gaussian Process (GP). The GP models the global correlation among all pixels in the 2D map. Data from one or more laser-based projection paths is propagated to all pixels in the map instead of just local pixels. The correlation among pixels is used to propagate projection path data from pixels traversed by a projection path to other pixels. Embodiments may be deployed as software as an application program tangibly embodied on a non-transitory computer readable program storage device. The application code for execution can reside on a plurality of different types of computer readable media known to those skilled in the art.

Figure 1:
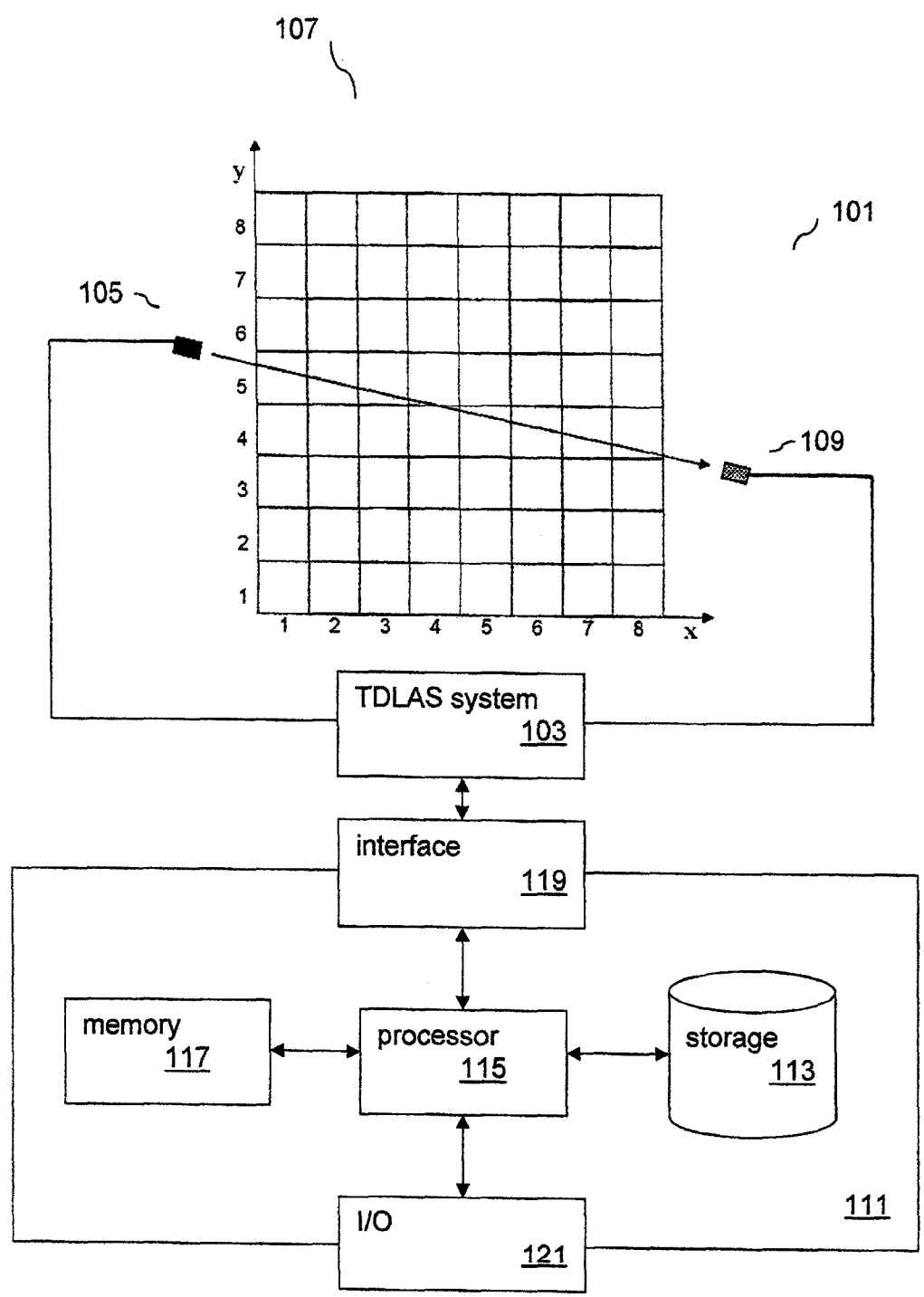
FIG. 1 is an exemplary system framework.
Figure 2A:
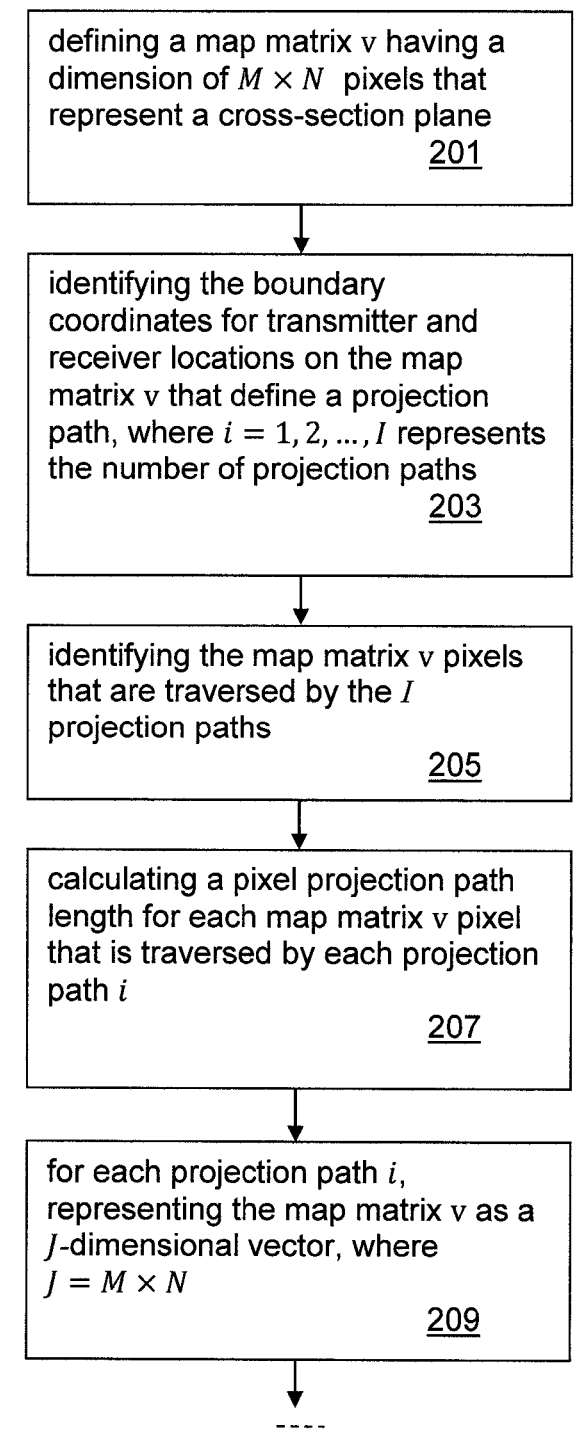
FIG. 2 is an exemplary method.
Figure 2B:
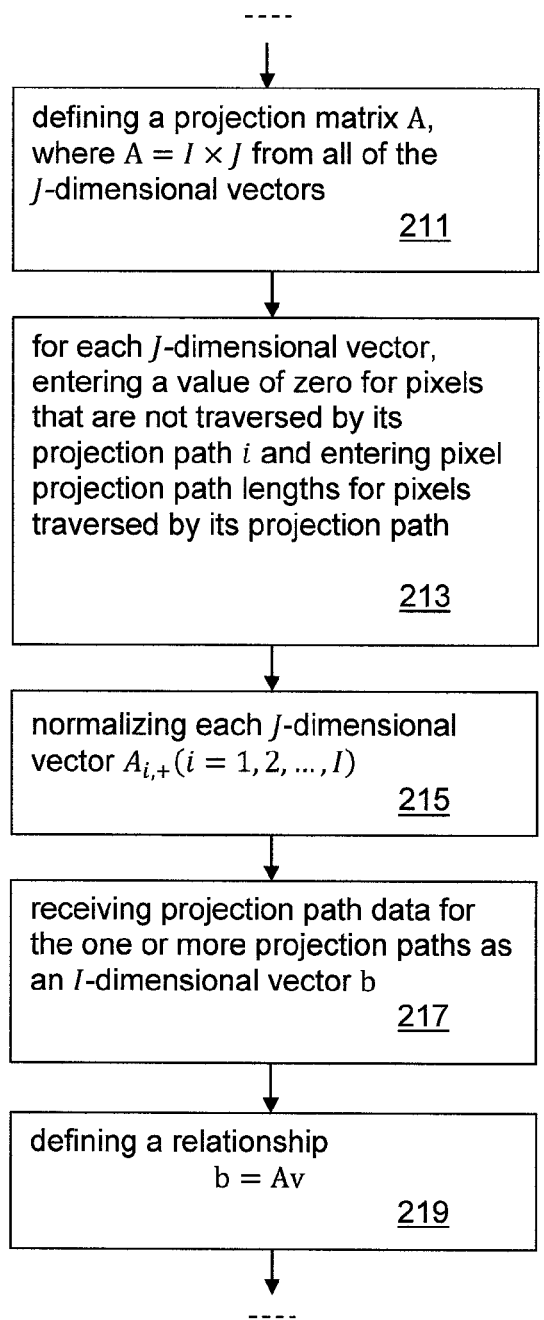
Figure 2C:
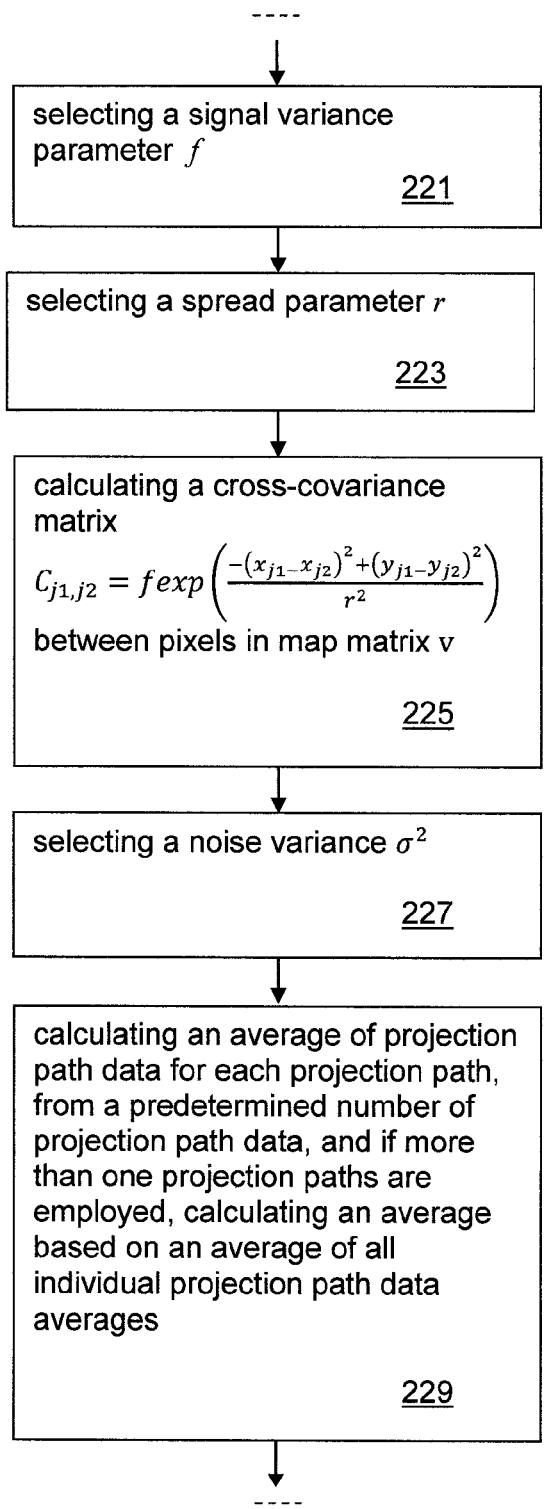
Figure 2D:
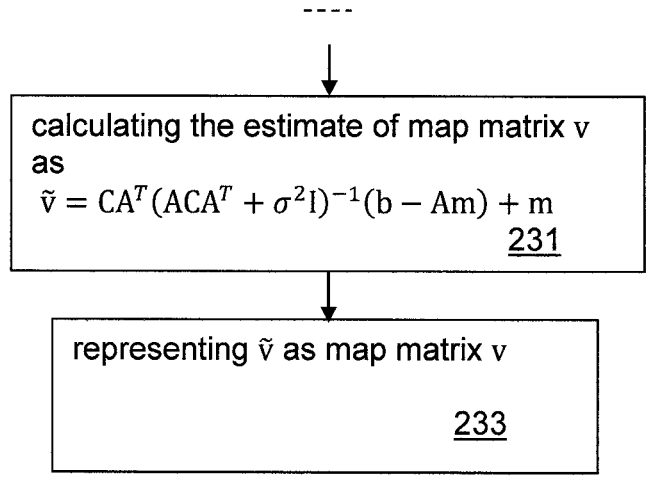

FIG. 1 shows an embodiment 101 that constructs a gas concentration map for output and display using one or more laser-based projection paths. The projection paths may be arbitrary with regard to a combustion region cross-section plane. A TDLAS system 103, or other laser-based absorption system, is employed and one projection path comprises a transmitter 105 that emits a laser beam through a combustion region 107 to a receiver 109. The TDLAS system 103 outputs an electrical signal representing a projection path parameter average value such as temperature or oxygen concentration, to a system framework 111 that executes the method.

The system framework 111 stores combustion region cross-section projection path data acquired from one or more projection paths into a data store 113. The framework 111 may be implemented as a computer including a processor 115, memory 117, software and other components. The processor 115 is coupled to the TDLAS system 103, an interface 119, I/O 121, the data store 113 and the memory 117 and controls the overall operation of the computer by executing instructions defining the configuration. The instructions may be stored in the data store 113, for example, an optical disk, and loaded into the memory 117 when executing the configuration. The invention may be implemented as an application defined by the computer program instructions stored in the memory 117 and/or storage 113 and controlled by the processor 115 executing the computer program instructions. The computer includes at least one interface 119 coupled to and communicating with the TDLAS system 103 to interrogate and receive TDLAS projection path data. The I/O 121 allows for user interaction with the computer via peripheral devices such as a display, a keyboard, a pointing device, and others.

FIG. 1 shows a user-defined, 2D map matrix v that comprises an M×N (8×8) grid having a predetermined resolution of 64 pixels, or cells, that represent a cross-section plane of the combustion region 107 (step 201). In the exemplary embodiment, M=N=8. However, M does not have to equal N. Embodiments estimate a pixel for each of the 64 pixels based on data received from one or more projection paths where I is the total number of projection paths and i=1, 2, ..., I. In FIG. 1, i=1=I.

Although embodiments can handle any projection path setup, and the locations of a transmitter and corresponding receiver that define a projection path may be placed anywhere to traverse a combustion region, paths are typically configured more practicable. A projection path is defined by two end points, a transmitter $(x_{e1}y_{e1})$ and a receiver $(x_{e2}y_{e2})$ which are on the boundary of the map matrix v since a transmitter 105 and receiver 109 cannot be mounted inside of a combustion region. Additionally, projection path geometry may traverse from left to right, right to left, top to bottom or bottom to top. This geometry makes better use of a path than, for example, a path from left to bottom. The actual location of a path's end points may be random.

The transmitter and receiver boundary locations for one or more projection paths are identified on map matrix v (step 203). FIG. 1 shows the projection path enters map matrix v at (0, 4.8) units and exits at (8, 3) units. The projection path traverses a straight line, from left to right between transmitter 105 and receiver 109.

Pixels that are traversed by a projection path are identified (step 205). FIG. 1 shows the projection path traversing pixels $v_{1,5}$, $v_{2,5}$, $v_{3,5}$, $v_{4,5}$, $v_{4,4}$, $v_{5,4}$, $v_{6,4}$, $v_{7,4}$ and $v_{8,4}$. A pixel projection path length is calculated for each pixel traversed by each projection path i (step 207).

For each projection path i, the map matrix v is represented as a J-dimensional vector for algebraic manipulation where J=M×N (step 209). There are two ways to identify a pixel entry in the J-dimensional vector. One is to use its Cartesian coordinates (x,y). The other is to use its corresponding J matrix index j.

A projection matrix A is defined from all of the J-dimensional vectors as A=I×J (step 211).

For each J-dimensional vector, a value of zero is entered for pixels that are not traversed by its projection path i and pixel projection path lengths are entered for pixels traversed by its projection path (step 213). In FIG. 1 for example, the J-dimensional vector for the map matrix v for projection path i=1 would contain 64 (J=M×N) entries. Entries $|J_5|$, $|J_{13}|$, $|J_{21}|$, $|J_{29}|$, $|J_{28}|$, $|J_{36}|$, $|J_{44}|$, $|J_{52}|$ and $|J_{60}|$ would be calculated pixel projection path lengths. The remaining 55 entries $J_{1-4}$, $J_{6-12}$, $J_{14-20}$, $J_{22-27}$, $J_{30-35}$, $J_{37-43}$, $J_{45-51}$, $J_{53-59}$ and $J_{61-64}$ would be zeros.

Each J-dimensional vector row $A_{i,+}$ (i=1, 2, . . . , I) is normalized (step 215) to make the projection path an average so that $A_{i,+}=1$.

Figure 3:
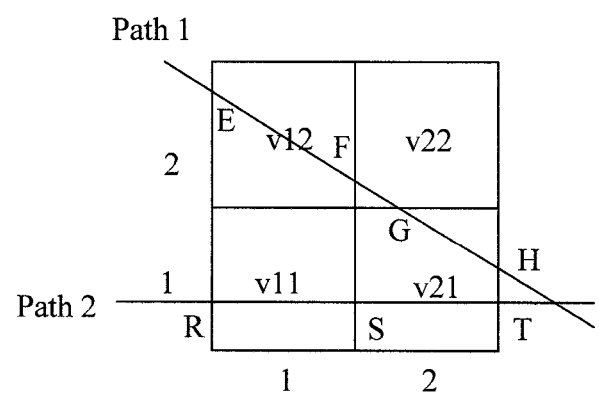
FIG. 3 is an exemplary map matrix v where M=N=2 and two projection paths (I=2) are employed.

FIG. 3 shows an exemplary map matrix v where M=N=2, with two projection paths (I=2), Path 1 (i=1) and Path 2 (i=2) traversing it. Path 1 traverses pixels $v_{1,2}$, $V_{2,2}$ and $v_{2,1}$ Path 2 traverses pixels $v_{1,1}$ and $v_{2,1}$. Projection path lengths are calculated for each pixel traversed by projection Path 1 and Path 2.

Projection path lengths |EF|, |FG| and |GH| are calculated for Path 1 pixels $v_{1,2}$, $V_{2,2}$ and $v_{2,1}$. Projection path lengths |RS| and |ST| are calculated for Path 2 pixels $v_{1,1}$ and $v_{2,1}$. Both Path 1 and Path 2 J-dimensional vectors are J=M×N=4.

The map matrix v is represented as $$J=[v_{1,1} v_{1,2} v_{2,1} v_{2,2}]=[j_1 j_2 j_3 j_4]. \quad (a)$$

The projection Path 1 J-dimensional vector is $$J_1=[0|EF||GH||FG|]. \quad (b)$$

The projection Path 2 J-dimensional vector is $$J_2=[|RS|0|ST|0]. \quad (c)$$

The normalizing fraction for projection Path 1 is $$\frac{1}{|EF|+|FG|+|GH|}. \quad (d)$$

The normalizing fraction for Projection Path 2 is $$\frac{1}{|RS|+|ST|}. \quad (e)$$

The projection matrix A (A=I×J) formed from the two J-dimensional vectors after normalizing is $$A = \begin{bmatrix} 0 & \frac{|EF|}{|EF|+|FG|+|GH|} & \frac{|GH|}{|EF|+|FG|+|GH|} & \frac{|FG|}{|EF|+|FG|+|GH|} \\ \frac{|RS|}{|RS|+|ST|} & 0 & \frac{|ST|}{|RS|+|ST|} & 0 \end{bmatrix} \quad (f)$$

Projection path data is acquired by the framework 111 and is assembled as an I-dimensional vector b, where i=1, 2, . . . , I, each $b_i$ is a projection path average value (step 217). The projection path data may be in samples per second.

The projection path data vector b and map matrix v have the following relationship $$b=Av \quad (1)$$

(step 219). Projection matrix A is assembled for the user defined map matrix v and remains constant as projection path data vector b is periodically updated with new projection path data. Map matrix v is solved for and provides a 2D map.

The sum of the i-th row and the sum of the j-th column of projection matrix A are defined by $$A_{i,+}=\Sigma_{j=1}^{J} A_{i,j} \text{ and} \quad (2)$$

$$A_{+,j}=\Sigma_{i=1}^{I} A_{i,j}. \quad (3)$$

Embodiments solve a linear equation (1) with projection matrix A and projection path data vector b known. If projection matrix A is an invertible square matrix, where I=J, then $v=A^{-1}b$. If I>j and projection matrix A has a full rank, based on linear least squares, $v=(A^T A)^{-1} A^T b$.

However, if I<<J, the problem is very under-constrained. In this case, there are multiple solutions satisfying (1).

By way of background, the Simultaneous Algebraic Reconstruction Technique (SART) algorithm is one of the most widely used ART algorithms. SART employs the iterative procedure $$v_j^{(k+1)} = v_j^{(k)} + \frac{\lambda}{A_{+,j}} \sum_{i=1}^{I} A_{i,j} \frac{b_i - (Av^{(k)})_i}{A_{i,+}}, \quad (5)$$

where $v_j^{(k)}$ denotes the current reconstruction map after a k-th iteration and $(Av^{(k)})_i$ indicates the estimated i-th projection from the current map.

In embodiments, $A_{i,+}=1$ and can be omitted from (5), but in general it has a non-zero value. (5) can be understood as follows. The residual between a true projection path $b_i$ and its estimated projection $(Av^{(k)})_i$ indicates in which direction $v_j^{(k+1)}$ should move from $v_j^{(k)}$ to reduce this residual. The final direction is determined by the weighted average of all I projection paths, each with a weight of $A_{i,j}$ normalized by $A_{+,j}$. The magnitude of this movement is adjusted by a parameter $\lambda$.

The SART algorithm is proven to converge to a solution of (1) if $A_{+,j} \neq 0$. However, there is no guarantee whether the found solution, out of all possible solutions, is realistic or not. In addition, in embodiments, the path configuration may be arbitrary. It often happens that $A_{+,j}=0$ for some columns so the j-th pixel is unobserved (not traversed). In such cases, division by zero will occur and (5) will stop. Embodiments are compared with the SART algorithm in simulations.

Embodiments model map matrix v as a multivariate Gaussian distribution $$P(v)= \mathcal{N}(v|m,C), \quad (6)$$

where m is a J-dimensional mean vector and C is a J×J covariance matrix. Since map matrix v is a 2D matrix, its distribution is referred to as a Gaussian Process (GP). Embodiments acknowledge that this GP is homogeneous since a priori knowledge about the differences between different locations is unavailable.

The cross-covariance $C_{j1,j2}$ between $v_{j1}$ and $v_{j2}$ in map matrix v is defined as $$C_{j1,j2} = f\exp\left(\frac{-(x_{j1}-x_{j2})^2 + (y_{j1}-y_{j2})^2}{r^2}\right), \quad (7)$$

where $(x_{j1}, y_{j1})$ are the coordinates for pixel $j_1$, $(x_{j2}, y_{j2})$ are the coordinates for pixel $j_2$, f is a signal variance parameter (real number) and r is a spread parameter (real number). The resulting cross-covariance matrix C is very large (J×J) (steps 221, 223, 225).

(7) shows that if pixels $j_1$ and $j_2$ are close to each other, their distance is small and thus the corresponding $v_{j1}$ and $v_{j2}$ will have high correlation. Otherwise, if pixels $j_1$ and $j_2$ are far apart, their distance is large and $v_{j1}$ and $v_{j2}$ will have low correlation. If $j_1=j_2$, $C_{j1,j2}=f$ which is the variance of $v_{j1}$.

To make the projection process probabilistic, a projection noise model e is introduced $$b = Av + e, \quad (8)$$

where e is a projection noise vector and has a Gaussian distribution of $$P(e) = \mathcal{N}(e|0, \sigma^2 I), \quad (9)$$

where $\sigma^2$ is a noise variance parameter (real number) and I is an I×I identity matrix (step 227).

Embodiments fix the signal variance parameter f=1 and the noise variance parameter $\sigma^2=0.001$ such that the variance ratio between signal and noise is large $$\frac{f}{\sigma^2} = 1{,}000.$$

A factor of 1,000 ensures faithfully reconstructing a 2D map without much distortion due to noise. At the same time, the noise variance $\sigma^2=0.001$ is also large enough to avoid a singular matrix before the matrix inverse in (10).

If the actual signal variance f is much larger than 1, f=1 and $\sigma^2$ may be multiplied using the same factor. This will not change the result of (12).

The projection data vector b can be modeled as another multivariate Gaussian distribution given the 2D map matrix v $$P(b|v) = \mathcal{N}(b|Am, \sigma^2 I), \quad (10)$$

where m is an average of b value averages for each projection path. Once enough projection path data is collected for the one or more projection paths, an average $\bar{b}$ from all averages is calculated. Each element in $m_j=\bar{b}$ in m, where j=1, 2, ..., J, is set due to the GP model. An average of projection path data for each projection path i, from a predetermined number of projection path data, is calculated. If more than one projection paths are employed, an average based on an average of all individual projection path data averages is calculated (step 229).

The joint probability $P(v,b) = P(v)P(b|v)$ can be written as $$P(v,b) = \mathcal{N}\left(\begin{bmatrix}v\\b\end{bmatrix}\middle|\begin{bmatrix}m\\Am\end{bmatrix}, \begin{bmatrix}C & CA^T\\AC & ACA^T+\sigma^2 I\end{bmatrix}\right), \quad (11)$$

where C is the J×J covariance matrix. Embodiments infer map matrix v from the projection paths b, or compute the conditional probability of P(v,b), which is another multivariate Gaussian distribution and is derived from (9).

The mean of P(v,b) is output as a reconstructed 2D map $$\tilde{v} = CA^T(ACA^T+\sigma^2 I)^{-1}(b-Am) + m \quad (12)$$

(steps 231, 233).

In practice, the performance of embodiments does not vary appreciably when r is between 0.5 and 1.5. Therefore, r=1.0 is fixed. Alternatively, the above parameters may be learned by cross validation.

(12) may be rewritten in a simpler linear form as $$\tilde{v} = GB + u, \quad (13)$$

where G equals $CA^T(ACA^T+\sigma^2 I)^{-1}$, B is a path projection and u equals $-CA^T(ACA^T+\sigma^2 I)^{-1}Am + m$. G and u are computed once offline and remain constant during execution.

The calculation of G and u may be problematic. First, the covariance matrix C has a size of J×J, where J=M×N, M=N and J>>I. Calculation and storage of C require a complexity of $O(N^4)$ if each element of C is calculated only once.

Second, after C is calculated, calculating G and u requires a complexity of $O(J^2 I)$ or $O(N^4 I)$. For a medium size 2D map, where M=N=200, this may pose a serious computational burden.

Embodiments adopt the following strategies to mitigate these issues. First, each element $C_{j1,j2}$ in C is a function of $|x_{j1}-x_{j2}|$ and $|y_{j1}-y_{j2}|$ as in (7). There are only N different values for all possible $|x_{j1}-x_{j2}|$ and $|y_{j1}-y_{j2}|$. Therefore, instead of indexing each element in C using $j_1$ and $j_2$, embodiments index them using $|x_{j1}-x_{j2}|$ and $|y_{j1}-y_{j2}|$. This indexing scheme reduces the handling cost for C from $O(N^4)$ to $O(N^2)$.

Second, the projection matrix A is a sparse matrix—each row has only $O(N)$ non-zero entries. Embodiments reduce the computational complexity for G and u from $O(N^4 I)$ to $O(N^3 I)$. Execution is fast because the complexity is just $O(N^2)$ once G and u are known.

Embodiments were compared with a ground-truth map. However, it is difficult to directly measure a gas concentration inside of a combustion region. In simulations, the size of the 2D map was set at M=N=200. The coordinates of the map were set to be between 0 and 1, meaning all pixel coordinates satisfy $0 \leq x_j, y_j \leq 1$ and each pixel has a size of 0.005×0.005.

A ground-truth map was generated by summing L 2D smooth functions. In particular, the j-th pixel value $v_j$ was produced as follows $$v_j = \sum_{l=1}^{L} h_l \exp\left(\frac{-(x_j-\mu_{xl})^2 + (y_j-\mu_{yl})^2}{s_l^2}\right), \quad (14)$$

where $(x_j, y_j)$ is the corresponding 2D coordinates of $v_j$. The l-th smooth function is defined by $$h_l \exp\left(\frac{-(x_j-\mu_{xl})^2 + (y_j-\mu_{yl})^2}{s_l^2}\right),$$

where l=1, 2, ..., L. There are four parameters for each function, $h_l$, $s_l$, $\mu_{xl}$ and $\mu_{yl}$, representing the peak, width and center locations of the function, respectively. L=10 was fixed for all simulations.

To produce a 2D map, each of the L=10 smooth functions were randomly created by selecting $h_l$ between 0 and 1, $s_l$ between 0.1 and 0.4, and $\mu_{xl}$ and $\mu_{yl}$ between 0 and 1, respectively. Then all of the L functions were summed to form the final ground-truth map v as in (11). The map created in this way is smooth, multi-peaked and with an irregular shape, which resembles a realistic gas concentration map. FIGS. 4A-4J show maps created using this approach, with a minimum to a maximum gradient scale. The number of projection paths I was increased from 1 to 500 for each map.

Embodiments were executed and the SART algorithm was executed for each path configuration and for each of the test maps. The reconstructed map $\tilde{v}$ from each is compared with the ground-truth map v using a mean squared error $$MSE = \sqrt{\frac{\sum_{j=1}^{J}(\tilde{v}_j - v_j)}{J}}.$$

The MSE scores are averaged from these results.

Figure 5:
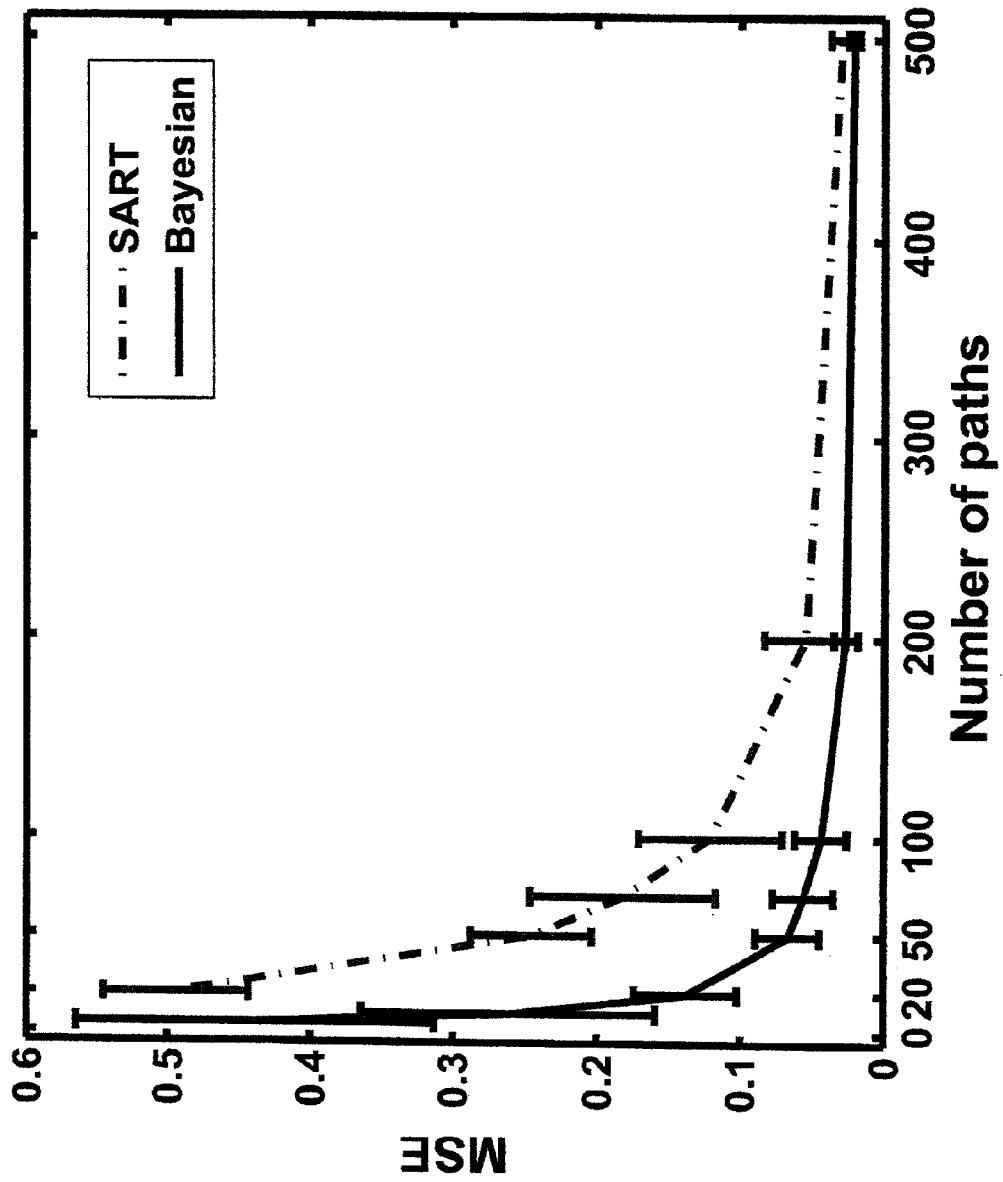
FIG. 5 is an exemplary mean squared error plot comparing an embodiment of the invention with the SART algorithm when the number of projection paths varies from 5 to 500.

FIG. 5 shows the comparison results between embodiments and the SART algorithm for paths I=5, 10, 20, 50, 70, 100, 200 and 500. One standard deviation error bar is also shown. For the SART algorithm, the parameter $\lambda$ in (4) is set to 1.0, which produces the lowest overall MSE errors.

Embodiments outperform the SART algorithm by producing lower MSE errors for all path settings. Due to division by zero, SART was unable to produce a reconstructed map when I is very small (5 and 10 (FIG. 4A)). In contrast, embodiments produce results for all I≥1.

Figure 4:
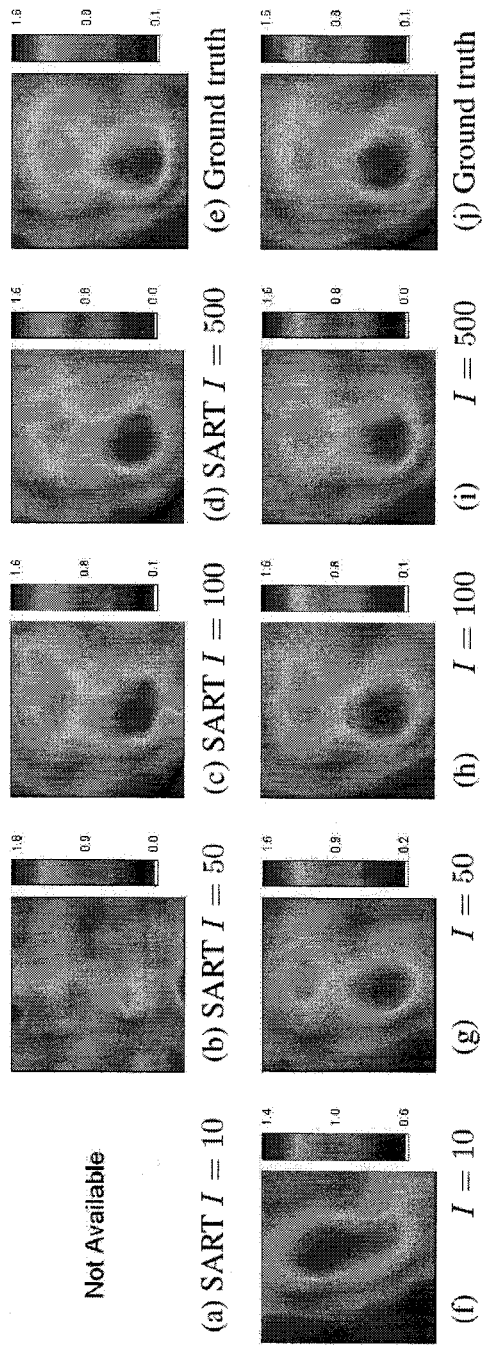
FIGS. 4A-4J are exemplary 2D simulation maps displayed in a gradient scale between a minimum and a maximum.

When I=0, the embodiments output m, the mean of the Gaussian Process (GP) because no extra information is available. FIGS. 4A-4J compare the reconstructed maps from both SART and embodiments for the test cases. Embodiments are able to reconstruct the rough structure of the map when I=10 (FIG. 4F). When I=50, the reconstructed results show much detail (FIG. 4G). However, SART can only produce reasonably good results when I=100 (FIG. 4C). At I=500, both methods produce results close to the ground-truth map (FIGS. 4E and 4J). At such a large I, there is adequate information for reconstruction.

One or more embodiments of the present invention have been described. Nevertheless, it will be understood that various modifications may be made without departing from the spirit and scope of the invention. Accordingly, other embodiments are within the scope of the following claims.

What is claimed is:

1. A method that constructs a two dimensional gas concentration map (image) from one dimensional laser-based projection path data comprising:
    defining a map having M×N pixels that represents a cross-section plane;
    identifying boundary coordinate locations on the map that define one or more projection paths where i=1, 2, . . . , I represents the number of projection paths;
    identifying the map pixels that are traversed by the I projection paths;
    calculating, via a processor, a pixel projection path length for each map pixel that is traversed by each projection path i;
    propagating the pixel projection lengths to other map pixels; and
    correlating the pixel projection lengths.

2. The method according to claim 1 further comprising defining the map as a matrix v.

3. The method according to claim 2 wherein propagating the pixel projection lengths further comprises:
    for each projection path i, representing the map matrix v as a J-dimensional vector, where J=M×N;
    for each J-dimensional vector, entering a value of zero for pixels that are not traversed by its projection path and entering pixel projection path lengths for pixels traversed by its projection path; and
    normalizing each J-dimensional vector $A_{i,+}$ (i=1, 2, . . . , I).

4. The method according to claim 3 wherein correlating the pixel projection lengths further comprises:
    defining a projection matrix A, where A=I×J from all of the J-dimensional vectors;
    defining a relationship b=Av;
    selecting a signal variance parameter f;
    selecting a spread parameter r; and
    calculating a cross-covariance matrix $$C_{j1,j2} = f\exp\left(\frac{-(x_{j1} - x_{j2})^2 + (y_{j1} - y_{j2})^2}{r^2}\right)$$

between pixels for map matrix v.

5. The method according to claim 4 further comprising receiving projection path data for the one or more projection paths as an I-dimensional vector b.

6. The method according to claim 5 further comprising calculating an average of projection path data for each projection path i, from a predetermined number of projection path data, and if more than one projection paths are employed, calculating an average based on an average of all individual projection path data averages.

7. The method according to claim 6 further comprising:
    selecting a noise variance $\sigma^2$; and
    calculating the estimate of map matrix v as $\tilde{v}=CA^T(ACA^T+\sigma^2I)^{-1}(b\times Am)+m$.

8. The method according to claim 7 further comprising representing $\tilde{v}$ as map matrix v.

9. A method that constructs a two dimensional gas concentration map (image) from one dimensional laser-based projection path data comprising:
    defining a map matrix v having M×N pixels that represents a cross-section plane of a combustion region;
    identifying boundary coordinate locations on the map matrix v that define one or more projection paths through the combustion region where i=1, 2, . . . , I represents the number of projection paths;
    identifying the map matrix v pixels that are traversed by the I projection paths;
    calculating, via a processor, a pixel projection path length for each map matrix v pixel that is traversed by each projection path i;
    for each projection path i, representing the map matrix v as a J-dimensional vector, where J=M×N;
    for each J-dimensional vector, entering a value of zero for pixels that are not traversed by its projection path and entering pixel projection path lengths for pixels traversed by its projection path;
    defining a projection matrix A, where A=I×J from all of the J-dimensional vectors;
    normalizing each J-dimensional vector $A_{i,+}$ (i=1, 2, . . . , I);
    receiving projection path data for the one or more projection paths as an I-dimensional vector b;
    defining a relationship b=Av;
    selecting a signal variance parameter f;
    selecting a spread parameter r;
    calculating a cross-covariance matrix $$C_{j1,j2} = f \exp\left(\frac{-(x_{j1} - x_{j2})^2 + (y_{j1} - y_{j2})^2}{r^2}\right)$$

between pixels for map matrix v;

selecting a noise variance $\sigma^2$;

calculating an average of projection path data for each projection path, from a predetermined number of projection path data, and if more than one projection paths are employed, calculating an average based on an average of all individual projection path data averages;

calculating the estimate of map matrix v as $\tilde{v} = CA^T(ACA^T + \sigma^2 I)^{-1}(b - Am) + m$;

representing $\tilde{v}$ as map matrix v; and monitoring combustion in the combustion region using the map matrix v.

10. A non-transitory computer readable medium having recorded thereon a computer program comprising code means for, when executed on a computer, instructing the computer to control steps in a method that constructs a two dimensional gas concentration map (image) from one dimensional laser-based projection path data, the method comprising:

defining a map having M×N pixels that represents a cross-section plane;

identifying boundary coordinate locations on the map that define one or more projection paths where i=1, 2, . . . , I represents the number of projection paths;

identifying the map pixels that are traversed by the I projection paths;

calculating, via a processor, a pixel projection path length for each map pixel that is traversed by each projection path i;

propagating the pixel projection lengths to other map pixels; and correlating the pixel projection lengths.

11. The non-transitory computer readable medium according to claim 10 further comprising defining the map as a matrix v.

12. The non-transitory computer readable medium according to claim 11 wherein propagating the pixel projection lengths further comprises:

for each projection path i, representing the map matrix v as a J-dimensional vector, where J=M×N;

for each J-dimensional vector, entering a value of zero for pixels that are not traversed by its projection path and entering pixel projection path lengths for pixels traversed by its projection path; and normalizing each J-dimensional vector $A_{i,+}$ (i=1, 2, . . . , I).

13. The non-transitory computer readable medium according to claim 12 wherein correlating the pixel projection lengths further comprises:

defining a projection matrix A, where A=I×J from all of the J-dimensional vectors;

defining a relationship b=Av;

selecting a signal variance parameter f;

selecting a spread parameter r; and calculating a cross-covariance matrix $$C_{j1,j2} = f \exp\left(\frac{-(x_{j1} - x_{j2})^2 + (y_{j1} - y_{j2})^2}{r^2}\right)$$

between pixels for map matrix v.

14. The non-transitory computer readable medium according to claim 13 further comprising receiving projection path data for the one or more projection paths as an I-dimensional vector b.

15. The non-transitory computer readable medium according to claim 14 further comprising calculating an average of projection path data for each projection path i, from a predetermined number of projection path data, and if more than one projection paths are employed, calculating an average based on an average of all individual projection path data averages.

16. The non-transitory computer readable medium according to claim 15 further comprising:

selecting a noise variance $\sigma^2$; and calculating the estimate of map matrix v as $\tilde{v} = CA^T(ACA^T + \sigma^2 I)^{-1}(b - Am) + m$.

17. The non-transitory computer readable medium according to claim 16 further comprising representing $\tilde{v}$ as map matrix v.

18. A non-transitory computer readable medium having recorded thereon a computer program comprising code means for, when executed on a computer, instructing the computer to control steps in a method that constructs a two dimensional gas concentration map (image) from one dimensional laser-based projection path data, the method comprising:

defining a map matrix v having M×N pixels that represents a cross-section plane of a combustion region;

identifying boundary coordinate locations on the map matrix v that define one or more projection paths through the combustion region where i=1, 2, . . . , I represents the number of projection paths;

identifying the map matrix v pixels that are traversed by the I projection paths;

calculating, via a processor, a pixel projection path length for each map matrix v pixel that is traversed by each projection path i;

for each projection path i, representing the map matrix v as a J-dimensional vector, where J=M×N;

for each J-dimensional vector, entering a value of zero for pixels that are not traversed by its projection path and entering pixel projection path lengths for pixels traversed by its projection path;

defining a projection matrix A, where A=I×J from all of the J-dimensional vectors;

normalizing each J-dimensional vector $A_{i,+}$ (i=1, 2, . . . , I);

receiving projection path data for the one or more projection paths as an I-dimensional vector b;

defining a relationship b=Av;

selecting a signal variance parameter f;

selecting a spread parameter r;

calculating a cross-covariance matrix $$C_{j1,j2} = f \exp\left(\frac{-(x_{j1} - x_{j2})^2 + (y_{j1} - y_{j2})^2}{r^2}\right)$$

between pixels for map matrix v;

selecting a noise variance $\sigma^2$;

calculating an average of projection path data for each projection path, from a predetermined number of projection path data, and if more than one projection paths are employed, calculating an average based on an average of all individual projection path data averages;

calculating the estimate of map matrix v as $\tilde{v} = CA^T(ACA^T + \sigma^2 I)^{-1}(b - Am) + m$;

representing $\tilde{v}$ as map matrix v; and monitoring combustion in the combustion region using the map matrix v.

\* \* \* \* \*